United States Patent
Isobe et al.

(10) Patent No.: US 7,370,906 B2
(45) Date of Patent: May 13, 2008

(54) DOOR HOLE SEAL FOR AUTOMOBILE

(75) Inventors: Masami Isobe, Hatukaichi (JP);
Kazutaka Imamura, Rancho Palos Verdes, CA (US); Takeshi Ishikawa, Utsunomiya (JP)

(73) Assignees: Nishikawa Rubber Co., Ltd., Hiroshima-shi (JP), part interest; Honda Motor Co., Ltd., Tokyo (JP), part interest ( * ) Notice: Subject to any disclaimer, the term of this patent is extended or adjusted under 35 U.S.C. 154(b) by 23 days.

(21) Appl. No.: 11/367,863

(22) Filed: Mar. 3, 2006

(65) Prior Publication Data
US 2007/0011949 A1    Jan. 18, 2007

(30) Foreign Application Priority Data
Apr. 5, 2005    (JP) ............................. 2005-108402

(51) Int. Cl.
*B60R 5/04*    (2006.01)

(52) U.S. Cl. .................. 296/146.7; 174/65 R (58) Field of Classification Search ................ 277/607, 277/616, 641, 921, 906; 296/146.7; 49/502, 49/475.1

See application file for complete search history.

(56) References Cited

U.S. PATENT DOCUMENTS 4,385,504 A * 5/1983 Perrone et al. ............ 62/259.1

FOREIGN PATENT DOCUMENTS

| JP | 9-56042 | 2/1997 |
| JP | 11078526 A * | 3/1999 |
| JP | 11-341651 | 12/1999 |
| JP | 2002-274289 | 9/2002 |
| JP | 2004-312846 | 11/2004 |

OTHER PUBLICATIONS

English Abstract for JP 11078526 A from the European Patents Office website.*

* cited by examiner

*Primary Examiner*—Dennis Pedder
*Assistant Examiner*—Melissa Black
(74) *Attorney, Agent, or Firm*—Frishauf, Holtz, Goodman & Chick, P.C.

(57) ABSTRACT

There is provided a door hole seal installed between an inner panel 1 and a door trim 2 of an automobile door, a part of which is provided with a slit mechanism 15 through which a wire harness 3 is pulled out, wherein said slit mechanism 15 is prepared by: watertightly installing at least an upper end of a sub-seal 30 on an outer-cabin side of a main seal 20; providing a first slit 21 on said main seal 20 in a horizontal direction; and providing a second slit 31 on the sub-seal 30 at a lower position than the first slit 21 in a horizontal direction.

15 Claims, 6 Drawing Sheets

DOOR HOLE SEAL FOR AUTOMOBILE

BACKGROUND OF THE INVENTION

The present invention relates to a door hole seal installed between an inner panel and a door trim of an automobile door to secure waterproofing, a part of which is provided with a slit mechanism through which a wire harness, for example for a window regulator, passes.

Figure 9:
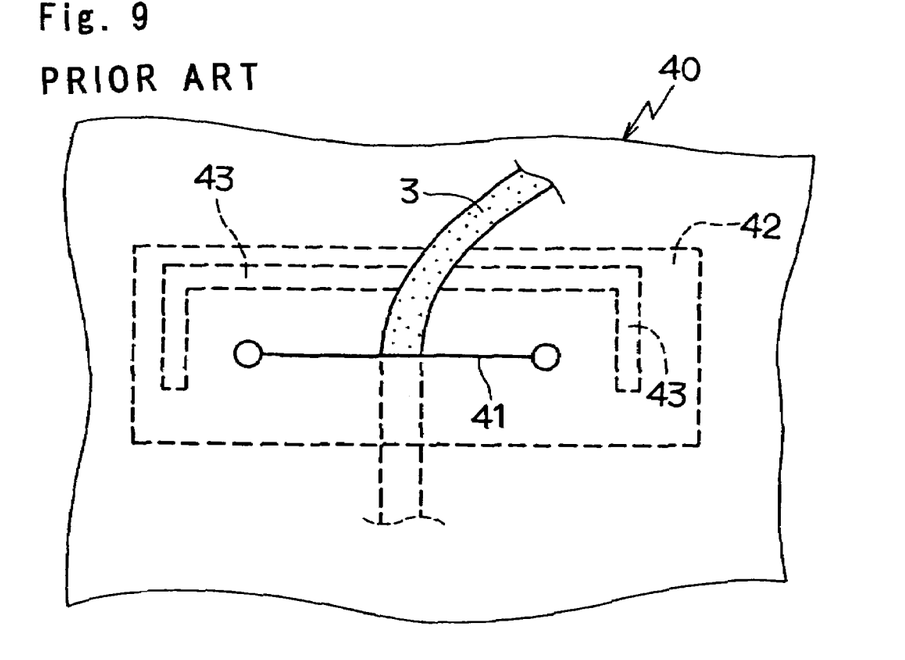
FIG. 9 is a lateral view at a relevant part of a door hole seal of a prior art.
Figure 10:
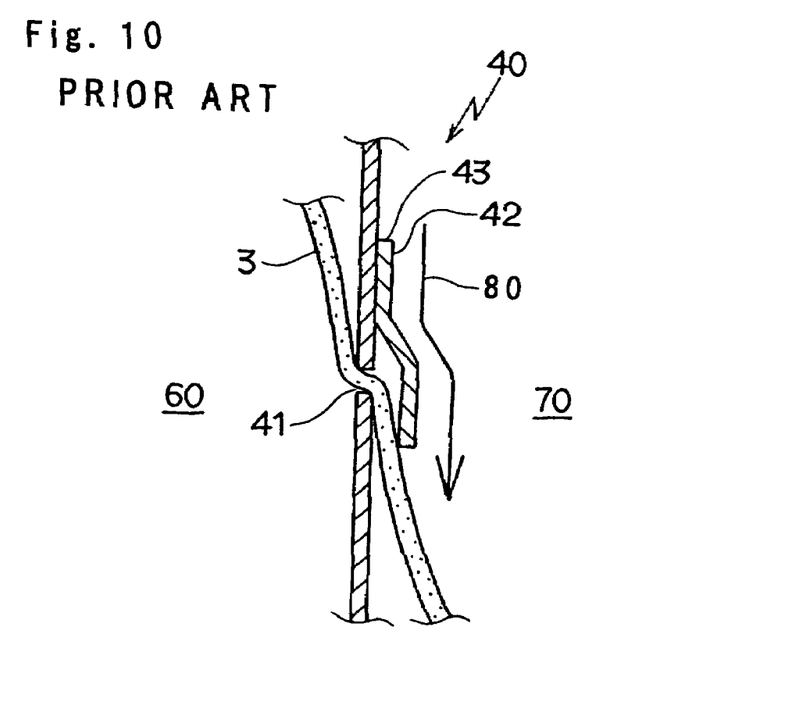
FIG. 10 is a longitudinal sectional view of the door hole seal shown in FIG. 9.

Generally, a door hole seal is installed between an inner panel of an automobile door and a door trim on a cabin side of the automobile door in order to secure favorable waterproofing. Some of the door hole seals are provided with a linear slit (straight slit) 41 extending in a horizontal direction which is used to pull out a wire harness 3, for example for a window regulator, from an outer-cabin side 70 to a cabin side 60 as shown in FIG. 9 and FIG. 10. For prevention of entrance of water 80 from the straight slit 41, a flap for water stop 42 having a fixing part 43 on an upper end and both side ends thereof is provided on a surface of the outer-cabin side 70 of the door hole seal 40.

The use of the door hole seal 40 provided with the straight slit 41 causes a high resistance in pulling out the wire harness 3 so that the operation to pull out the wire harness 3 becomes difficult. In order to overcome this difficulty, a door hole seal 50 provided with a round-shaped slit (round slit) 51 instead of the straight slit 41 shown in FIG. 11 has been proposed. The door hole seal 50 is also provided with a flap for water stop 52 by means of a fixing part 53 on the surface of the outer-cabin side 70 for prevention of the entrance of water 80 from the round slit 51.

Unfortunately, however, although the door hole seal 40 with the usual straight slit 41 is provided with the flap for water stop 42 of which the fixing part 43 at the upper end and both side ends thereof is fixed to the door hole seal 40, a lower end of the flap for water stop 42 is widely open so that there has remained a problem that water 80 including rainwater and car washing water enters the cabin side 60 directly or along the wire harness 3 through the straight slit 41.

Figure 11:
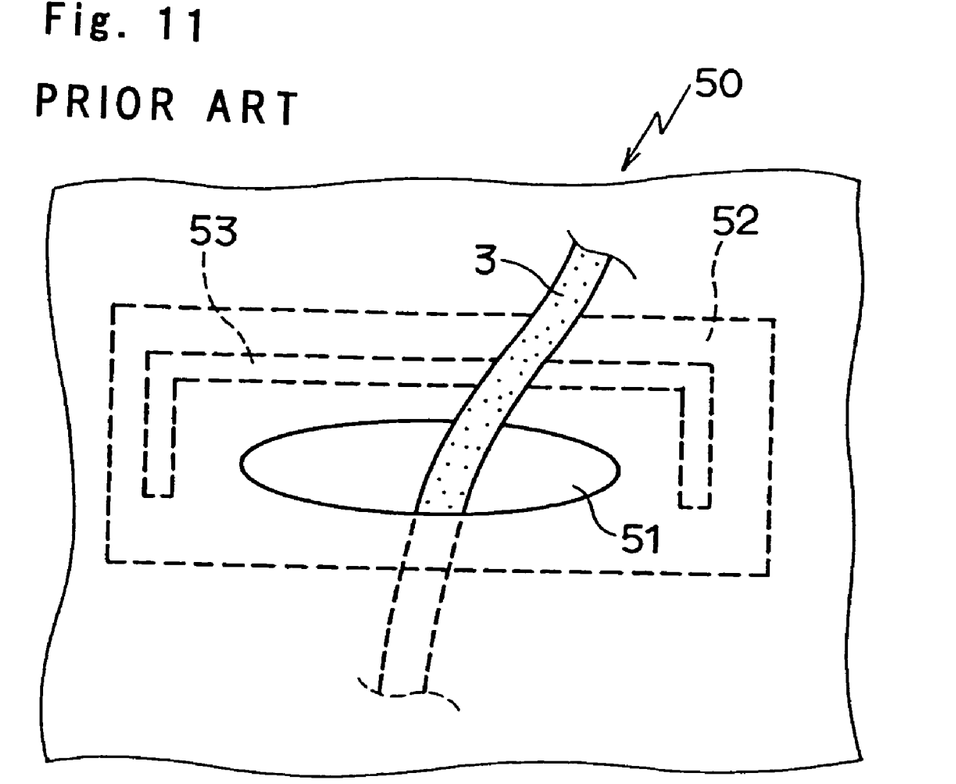
FIG. 11 is a lateral view at a relevant part of a door hole seal of another prior art.

On the other hand, the door hole seal 50 with the usual round slit 51 has an advantage that lower frictional resistance generates when pulling out the wire harness 3 so that the operation to pull out the wire harness 3 becomes easy, but there remains a problem that the round slit 51 opens more widely than the straight slit 41 so that water 80 is more likely to enter.

Therefore, an object of the present invention is to provide a door hole seal which is capable of preventing water from entering a cabin side and simplifies an operation to pull out a wire harness.

SUMMARY OF THE INVENTION

In order to achieve the above-mentioned object, a first aspect of the invention provides a door hole seal (10) installed between an inner panel (1) and a door trim (2) of an automobile door, a part of which is provided with a slit mechanism (15) through which a wire harness (3) is pulled out from an outer-cabin side to a cabin side, wherein said slit mechanism (15) is prepared by: watertightly installing at least an upper end of a sub-seal (30) on an outer-cabin side of a main seal (20); providing a first slit (21) on said main seal (20) in a horizontal direction; and providing a second slit (31) on said sub-seal (30) at a lower position than the first slit (21) in a horizontal direction.

A second aspect of the invention provides a door hole seal (10), wherein said first slit (21) and said second slit (31) are linear.

A third aspect of the invention provides a door hole seal (10), wherein said first slit (21) roughly forms U shape which opens upward and said second slit (31) roughly forms reverse U shape which opens downward.

A fourth aspect of the invention provides a door hole seal (10), wherein both said first slit (21) and said second slit (31) roughly form U shape which opens upward.

A fifth aspect of the invention provides a door hole seal (10), wherein a part of an interval in the height direction between said first slit (21) and said second slit (31), through which said wire harness (3) is pulled out has the shortest distance (d) compared with other part of the interval in the height direction.

A sixth aspect of the invention provides a door hole seal (10), wherein round hole shape parts (22, 32) having a diameter longer than width of the slit is formed on at least one end of either said first slit (21) or said second slit (31) or both said first slit (21) and said second slit (31).

A seventh aspect of the invention provides a door hole seal (10), wherein curvilinear shape parts (23, 33) having a curvature radius longer than a radius of said round hole shape parts (22, 32) are formed inward compared with the ends of the slits (21, 31) on said slit shape.

An eighth aspect of the invention provides a door hole seal (10), wherein at least said sub-seal (30) is formed of waterproof material.

Numerals in parentheses show constituents or items corresponding to Figures and DESCRIPTION OF PREFERRED EMBODIMENT. When the constituents or the items correspond to those in the prior art, the same symbols are used.

According to the door hole seal according to the first aspect of the present invention, the slit mechanism is prepared by: watertightly installing at least the upper end of the sub-seal on the outer-cabin side of the main seal; providing the first slit, for example a linear slit, on the main seal in the horizontal direction; and providing the second slit, for example a linear slit, at the lower position on the sub-seal than the first slit in the horizontal direction. Therefore, water which drips along the outer-cabin side surface of the sub-seal is prevented without fail from entering the cabin side directly or along the wire harness through the second slit and the first slit.

That is, when water drips along the outer-cabin side surface of the sub-seal, the dripped water is prevented from entering the cabin side for the effect of the second slit extending in the horizontal direction. Further, even if the water passes through the second slit, the amount of the water is very little and the water is prevented without fail from entering the cabin side for the effect of the first slit provided at an upper position than the second slit, which is also extending in the horizontal direction.

In addition, even if the water moves to the cabin side along the wire harness, at least an upper end and a lower end of the wire harness makes an elastic contact with the second slit and the first slit so that the water drains away for the effect of the two slits and entrance of the water into the cabin side is shut out.

Further, even if the water remains stuck to the wire harness when pulling out the wire harness to the cabin side, the water drains away for the effect of the second slit and the first slit in the same manner as above so that the entrance of the water into the cabin side is prevented.

According to the door hole seal according to the third and fourth aspects of the present invention, the first slit roughly forms a U shape and the second slit roughly forms a reverse U shape, or both the first slit and the second slit roughly form a U shape. Therefore, when pulling out the wire harness to the cabin side, the first slit and the second slit open widely with both ends thereof as fulcrums so that frictional resistance between the slits and the wire harness decreases and therefore, the operation of pulling out the wire harness becomes easy.

Except for the unusual condition that the wire harness is pulled out, the first slit and the second slit are closed to form roughly linear lines and make the elastic contact with at least upper and lower ends of the wire harness so that the entrance of the water into an indoor side is prevented without fail.

According to the door hole seal according to the fifth aspect of the present invention, a part of the interval in the height direction between the first slit and the second slit through which the wire harness is pulled out has the shortest distance compared with another part of the interval in the height direction so that the entrance of water into the indoor side is prevented without fail and the wire harness is easily pulled out to the indoor side.

That is, the water 80 which drips along the outer-cabin side of the sub-seal is prevented from entering the cabin side for the effect of the second slit and the first slit as mentioned above. In addition, a part of the interval in the height direction between the first slit and the second slit, through which the wire harness is pulled out has the shortest distance (namely, the distance between the first slit and the second slit is short) so that the frictional resistance between the slits and the wire harness which generates when pulling out the wire harness can be controlled, thus the wire harness is pulled out easily with lower power.

According to the door hole seal according to the sixth aspect of the present invention, the round hole shape parts having the diameter longer than the width of the slit is formed on at least one end of either the first slit or the second slit or both the first slit and the second slit so tearing of the slit caused by pulling out the wire harness is prevented.

According to the door hole seal according to the seventh aspect of the present invention, the curvilinear shape parts having the curvature radius longer than the radius of the round hole shape parts are formed inward compared with the ends of the slits on the slit shape so that tearing of the slit caused by pulling out the wire harness is further prevented.

According to the door hole seal according to the eighth aspect of the present invention, at least the sub-seal is formed of the waterproof material so that the water is further prevented from entering the cabin side without fail.

DESCRIPTION OF PREFERRED EMBODIMENT

Figure 1:
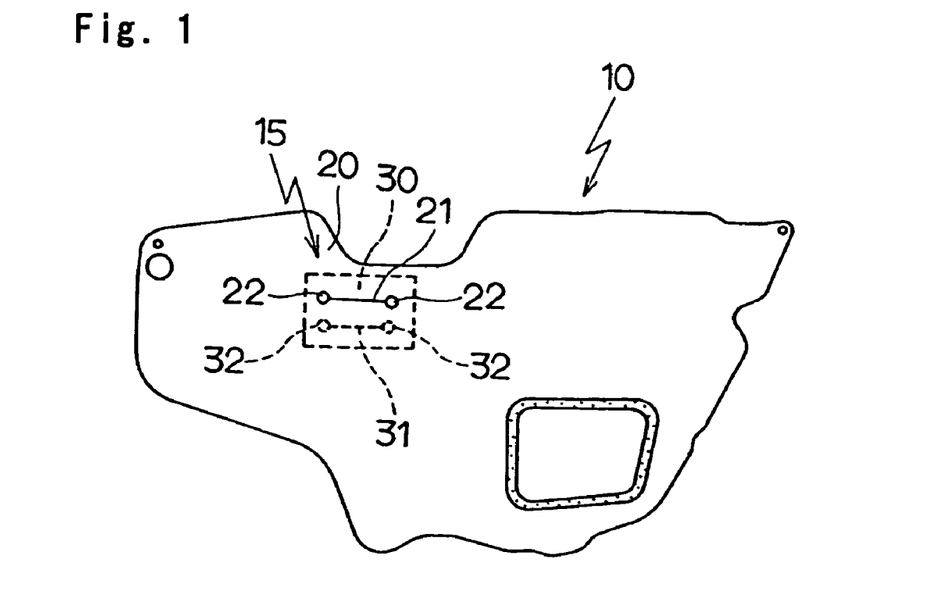
FIG. 1 is a lateral view of a door hole seal of a first embodiment of the present invention.
Figure 2:
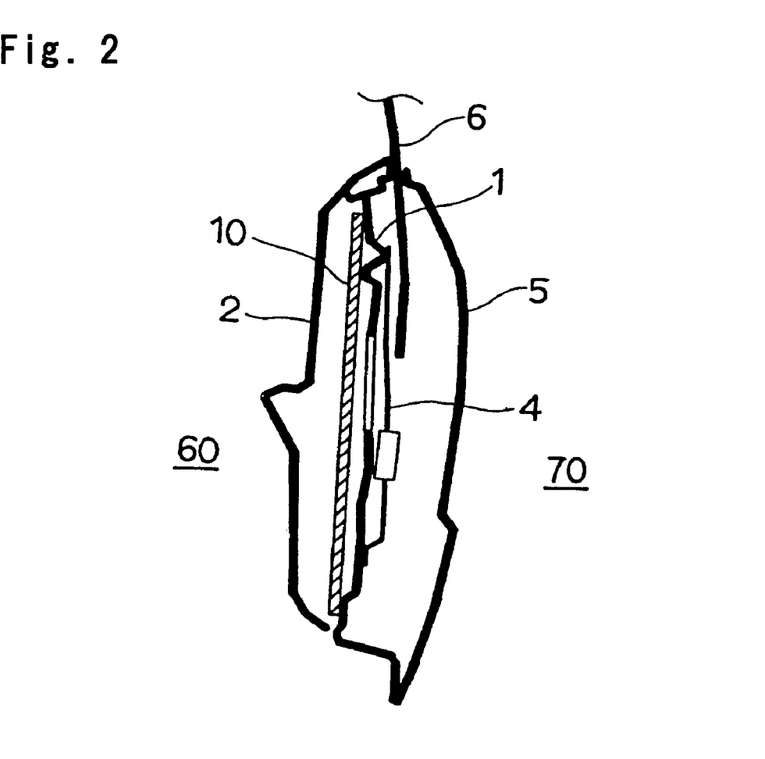
FIG. 2 is a schematic longitudinal sectional view of an automobile door provided with the door hole seal shown in FIG. 1.
Figure 3:
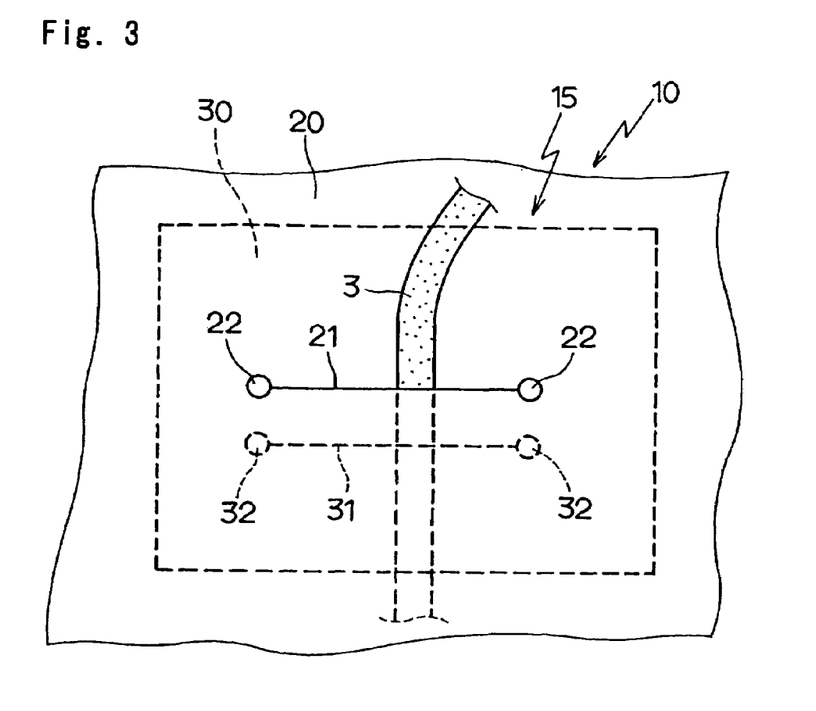
FIG. 3 is a lateral view at a relevant part of the door hole seal shown in FIG. 1.
Figure 4:
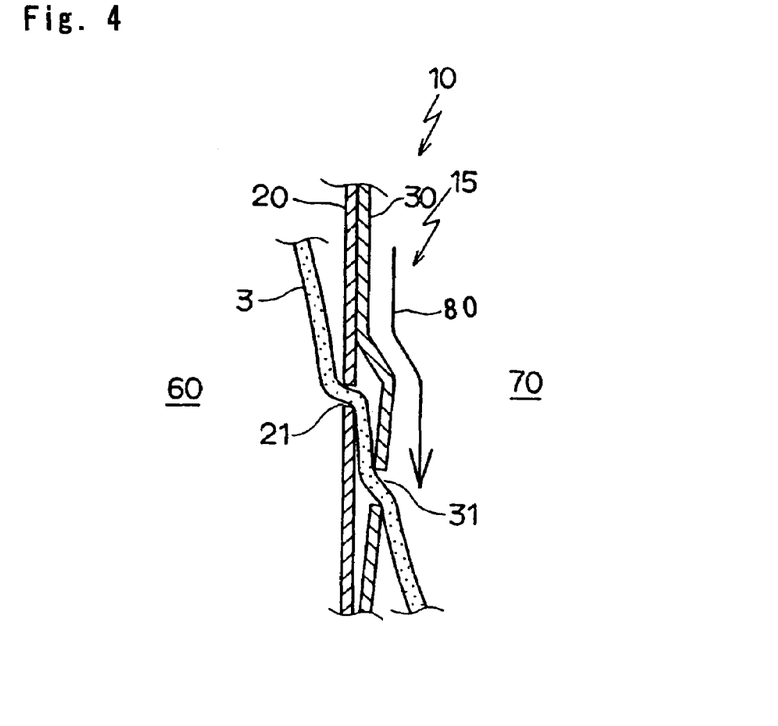
FIG. 4 is a longitudinal sectional view at a relevant part of the door hole seal shown in FIG. 1.

Referring to FIGS. 1 to 4, a door hole seal 10 according to a first embodiment of the invention will be described. FIG. 1 is a lateral view of the door hole seal 10 of a first embodiment of the present invention; and FIG. 2 is a schematic longitudinal sectional view of an automobile door provided with the door hole seal 10 shown in FIG. 1. FIG. 3 is a lateral view at a relevant part of the door hole seal 10 shown in FIG. 1; and FIG. 4 is a longitudinal sectional view at a relevant part of the same.

The door hole seal 10 of the first embodiment of the present invention is installed between an inner panel 1 and a door trim 2 of an automobile door, and a slit mechanism 15 for pulling out a wire harness 3 for a window regulator 4 to raise or lower door glass 6 from an outer-cabin side to a cabin side is provided at an upper end of the door hole seal 10. The slit mechanism 15 is prepared by: watertightly installing peripheral ends of a sub-seal 30, including top and bottom, right and left ends on an outer-cabin side of a main seal 20; providing a linear first slit 21 extending in a horizontal direction on said main seal 20; and providing a linear second slit 31 extending in a horizontal direction on the sub-seal 30 at a lower position than the first slit 21.

On an outer-cabin side 70 of a door inner panel 1, a door glass 6 and an outer panel 5 are installed. At least an upper end of the sub-seal 30 requires to be watertightly installed to the main seal 20. But the full length of the peripheral ends of the sub-seal 30 may be watertightly installed as in the present embodiment. The upper end, the right end and the left end of the sub-seal 30 may also be watertightly installed.

According to the door hole seal 10, when water 80 including rainwater and car washing water drips along the outer-cabin side 70 surface of the sub-seal 30, the water 80 is prevented without fail from entering a cabin side 60 for the effect of the roughly linear second slit 31 and first slit 21 which are extending in the horizontal direction.

In addition, even if the water 80 moves to the cabin side 60 along the wire harness 3, at least an upper end and a lower end of the wire harness 3 makes an elastic contact with the second slit 31 and the first slit 21 so that the water 80 drains away at the elastically contacting parts. Therefore, entrance of the water 80 into the cabin side 60 is shut out.

In the present embodiment, the main seal 20 and the sub-seal 30 are formed of waterproof material so that the water 80 is prevented from permeating the main seal 20 and the sub-seal 30 and entering the cabin side.

Further, in the present embodiment, slit locking parts 22, 32 of round hole shape parts (circular shape) are formed on both ends of the first slit 21 and the second slit 31 so as to prevent tear of each slit 21 and 31.

Figure 5:
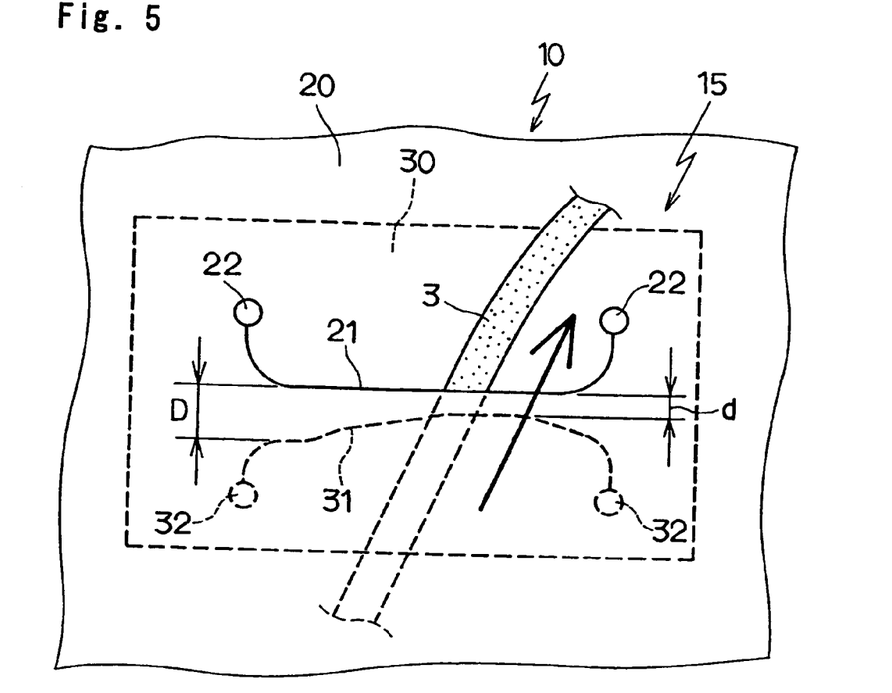
FIG. 5 is a lateral view at a relevant part of a door hole seal of a second embodiment of the present invention.
Figure 6:
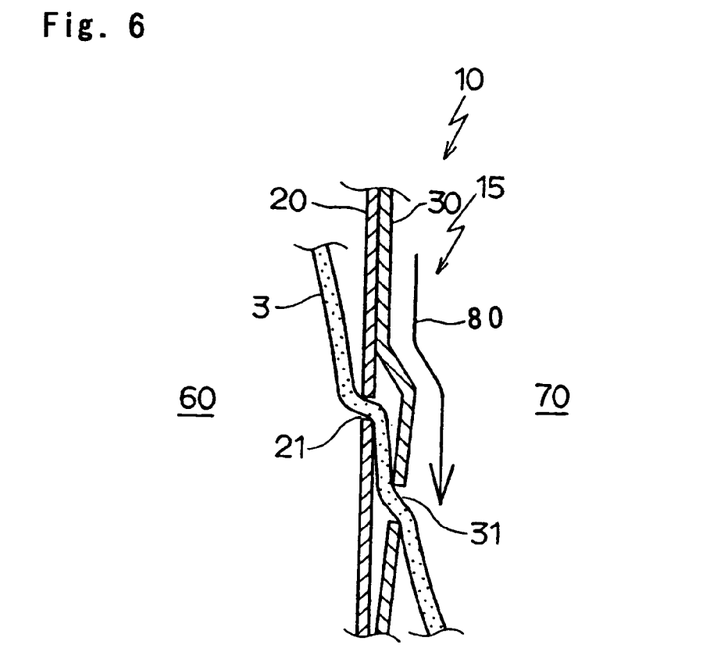
FIG. 6 is a longitudinal sectional view at a relevant part of the door hole seal shown in FIG. 5.

Referring to FIGS. 5 and 6, a door hole seal 10 according to a second embodiment of the invention will be described. FIG. 5 is a lateral view at a relevant part of the door hole seal of a second embodiment of the present invention and FIG.

6 is a longitudinal sectional view at a relevant part of the door hole seal shown in FIG. 5.

The door hole seal 10 is characterized in that a first slit 21 roughly forms U shape which opens upward and a second slit 31 roughly forms reverse U shape which opens downward. In addition, a part of an interval in the height direction between the first slit 21 and the second slit 31, through which the wire harness 3 is pulled out has the shortest distance "d" compared with other part of the interval in the height direction. In the present embodiment, because the wire harness 3 is pulled out in the direction of the upper right as shown in FIG. 5, the second slit 31 inclines roughly to the upper right so that the right-hand side part becomes the shortest distance "d" whereas the left-hand side part becomes the longest distance "D".

In the door hole seal 10, both the first slit 21 and the second slit 31 fully open with both ends thereof as fulcrums so that the frictional resistance between the slits and the wire harness 3 can be controlled and the wire harness 3 is pulled out easily with lower power.

In normal conditions, the first slit 21 and the second slit 31 are closed to form roughly linear lines and make the elastic contact with at least upper and lower ends of the wire harness 3 so that the entrance of the water 80 into an indoor side is prevented without fail.

In the door hole seal 10, a part of the interval in the height direction between the first slit and the second slit, through which the wire harness 3 is pulled out has the shortest distance "d". Therefore, the entrance of the water 80 into the indoor side is prevented without fail and the wire harness 3 is easily pulled out to the indoor side.

That is, the water 80 which drips along an outer-cabin side 70 of the sub-seal 30 is prevented from entering the cabin side 60 for the effect of the second slit 31 and the first slit 21. In addition, a part of the interval in the height direction between the first slit 21 and the second slit 31, through which the wire harness 3 is pulled out has the shortest distance "d" so that the frictional resistance which generates when pulling out the wire harness 3 can be controlled. Therefore, the wire harness 3 is pulled out easily with lower power.

In the present embodiment, the sub-seal 30 is formed of the waterproof material so that the water 80 is prevented from permeating the sub-seal 30 and entering the main seal 20 and the cabin side 60.

Figure 7:
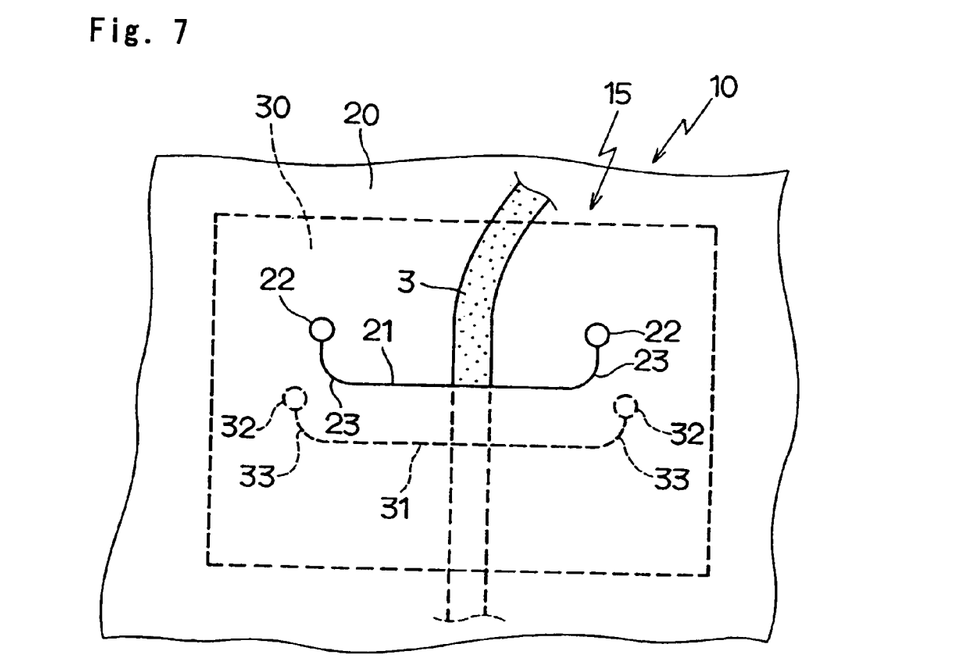
FIG. 7 is a lateral view at a relevant part of a door hole seal of a third embodiment of the present invention.

Further, referring to FIG. 7, a door hole seal 10 according to a third embodiment of the invention will be described. FIG. 7 is a lateral view at a relevant part of a door hole seal of a third embodiment of the present invention.

The door hole seal 10 is characterized in that a first slit 21 roughly forms U shape which opens upward and a second slit 31 also roughly form U shape which opens upward.

According to the door hole seal 10, in the same manner as the second embodiment of the present invention, both the first slit 21 and the second slit 31 fully open with both ends thereof as fulcrums so that the frictional resistance between the slits and the wire harness 3 can be controlled. Therefore, the wire harness 3 is pulled out easily with lower power.

In addition, curvilinear shape parts 23, 33 having a curvature radius longer than a radius of round hole shape parts (circular shape) as slit locking parts 22, 32 are formed inward compared with the ends of the first slit 21 and the second slit 31.

Therefore, tear of the slits 21, 31 in pulling out the wire harness 3 is further prevented.

Further, referring to FIG. 8, a door hole seal 10 according to a fourth embodiment of the invention will be described.

Figure 8:
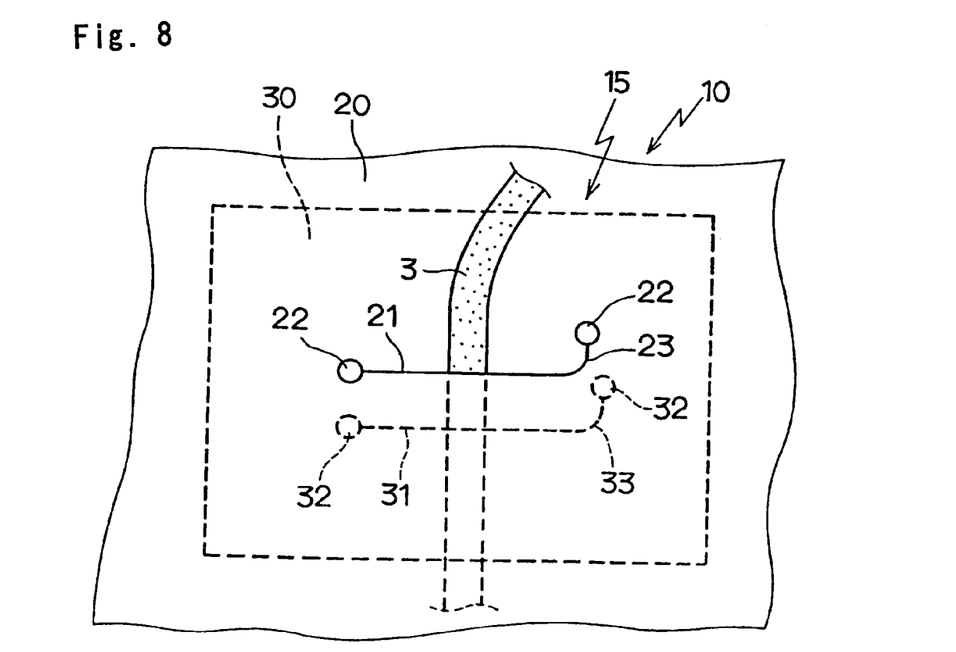
FIG. 8 is a lateral view at a relevant part of a door hole seal of a fourth embodiment of the present invention.

FIG. 8 is a lateral view at a relevant part of the door hole seal of a fourth embodiment of the present invention.

In the fourth embodiment, curvilinear shape parts 23, 33 are formed on one end of each of the linear first slit 21 and second slit 31 whereas the curvilinear shape parts 23, 33 are formed on both ends of the linear first slit 21 and second slit 31 in the third embodiment.

According to the door hole seal of the fourth embodiment, tear of the slits 21, 31 is prevented by pulling out a wire harness from the side on which the curvilinear shape parts 23, 33 are formed (right side in FIG. 8).

In the present embodiment, a main seal 20 and a sub-seal 30 may be the same size, or, the sub-seal 30 may be installed only on a part where a slit mechanism 15 is provided. The former contributes to improvement of noise isolation whereas the latter contributes to reduction of molding material.

We claim:

1. A door hole seal which is adapted to be installed between an inner panel and a door trim of an automobile door, and a part of which is provided with a slit mechanism through which a wire harness is pulled out from an outer-cabin side of the door hole seal to a cabin side of the door hole seal, the door hole seal comprising:
a main seal;
a sub-seal, at least an upper end of which is watertightly installed on an outer-cabin side of the main seal;
a first slit, which is provided in the main seal, and which extends in a horizontal direction; and
a second slit, which is provided in the sub-seal so as to be positioned lower than the first slit, and which extends in the horizontal direction;
wherein the first slit and the second slit are closed to form roughly linear lines except when the wire harness is pulled out from the outer-cabin side of the door hole seal to the cabin side of the door hole seal through the first and second slits; and
wherein when the wire harness is pulled out from the outer-cabin side of the door hole seal to the cabin side of the door hole seal through the first and second slits, the first and second slits make elastic contact with at least an upper part and a lower part of the wire harness so as to prevent entrance of water to the cabin side of the door hole seal.

2. A door hole seal as claimed in claim 1, wherein the first slit and the second slit are linear.

3. A door hole seal as claimed in claim 1, wherein an interval is provided between portions of the first slit and the second slit that are adjacent to each other along a vertical direction, and the interval is shortest at a part of the interval through which said wire harness is pulled out, compared with at least one other part of the interval.

4. A door hole seal as claimed in claim 1, wherein a round hole having a diameter longer than a width of the slit is formed at at least one end of at least one of said first slit and said second slit.

5. A door hole seal as claimed in claim 1, wherein at least said sub-seal is formed of waterproof material.

6. A door hole seal which is adapted to be installed between an inner panel and a door trim of an automobile door, and a part of which is provided with a slit mechanism through which a wire harness is pulled out from an outer-cabin side of the door hole seal to a cabin side of the door hole seal, the door hole seal comprising:
a main seal;
a sub-seal, at least an upper end of which is watertightly installed on an outer-cabin side of the main seal;

a first slit, which is provided in the main seal, and which extends in a horizontal direction; and a second slit, which is provided in the sub-seal so as to be positioned lower than the first slit, and which extends in the horizontal direction;

wherein said first slit roughly forms a U shape which opens upwards, and said second slit roughly forms a reverse U shape which opens downward.

7. A door hole seal as claimed in claim 6, wherein an interval is provided between portions of the first slit and the second slit that are adjacent to each other along a vertical direction, and the interval is shortest at a part of the interval through which said wire harness is pulled out, compared with at least one other part of the interval.

8. A door hole seal as claimed in claim 6, wherein a round hole having a diameter longer than a width of the slit is formed at at least one end of at least one of said first slit and said second slit.

9. A door hole seal as claimed in claim 6, wherein at least said sub-seal is formed of waterproof material.

10. A door hole seal which is adapted to be installed between an inner panel and a door trim of an automobile door, and a part of which is provided with a slit mechanism through which a wire harness is pulled out from an outer-cabin side of the door hole seal to a cabin side of the door hole seal, the door hole seal comprising:

a main seal;

a sub-seal, at least an upper end of which is watertightly installed on an outer-cabin side of the main seal;

a first slit, which is provided in the main seal, and which extends in a horizontal direction; and a second slit, which is provided in the sub-seal so as to be positioned lower than the first slit, and which extends in the horizontal direction;

wherein said first slit roughly forms a U shape which opens upward, and said second slit roughly forms a U shape which opens upward.

11. A door hole seal as claimed in claim 10, wherein an interval is provided between portions of the first slit and the second slit that are adjacent to each other along a vertical direction, and the interval is shortest at a part of the interval through which said wire harness is pulled out, compared with at least one other part of the interval.

12. A door hole seal as claimed in claim 10, wherein a round hole having a diameter longer than a width of the slit is formed at at least one end of at least one of said first slit and said second slit.

13. A door hole seal as claimed in claim 10, wherein at least said sub-seal is formed of waterproof material.

14. A door hole seal which is adapted to be installed between an inner panel and a door trim of an automobile door, and a part of which is provided with a slit mechanism through which a wire harness is pulled out from an outer-cabin side of the door hole seal to a cabin side of the door hole seal, the door hole seal comprising:

a main seal;

a sub-seal, at least an upper end of which is watertightly installed on an outer-cabin side of the main seal;

a first slit, which is provided in the main seal, and which extends in a horizontal direction;

a second slit, which is provided in the sub-seal so as to be positioned lower than the first slit, and which extends in the horizontal direction;

wherein a round hole having a diameter that is longer than a width of the slit is formed at at least one end of at least one of the first slit and the second slit; and wherein each of the first and second slits has curvilinear shape parts, each having a curvature radius that is longer than a radius of said round hole, formed inward with respect to ends of the slit.

15. A door hole seal as claimed in claim 14, wherein at least said sub-seal is formed of waterproof material.

* * * * *